United States Patent Office 3,414,111
Patented Dec. 3, 1968

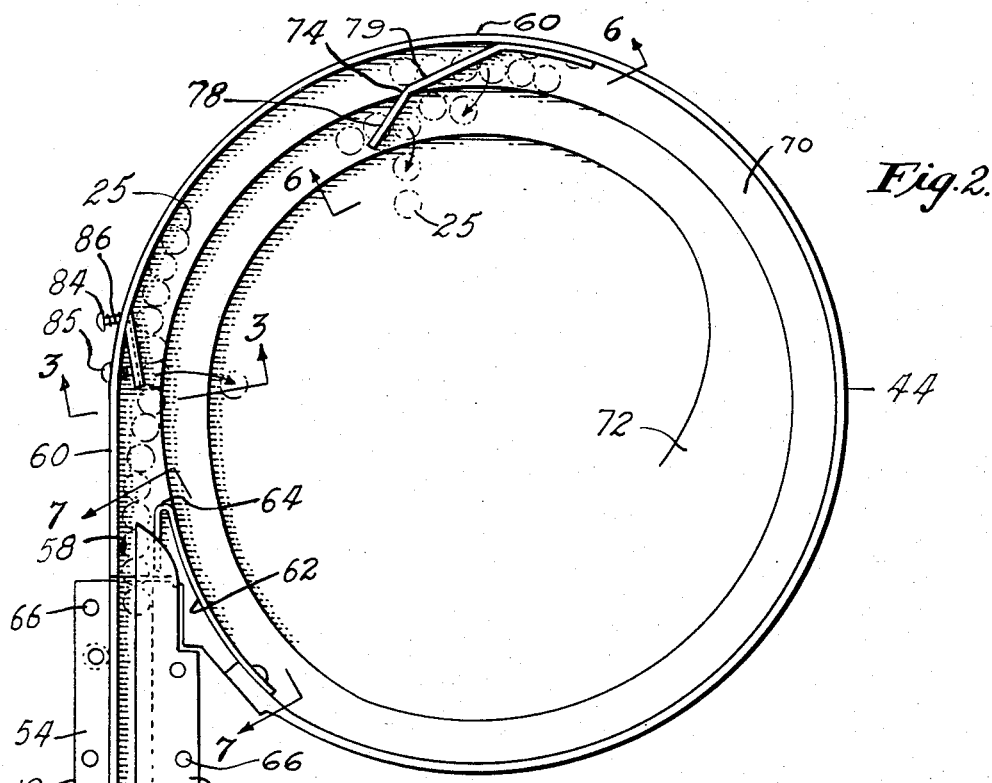

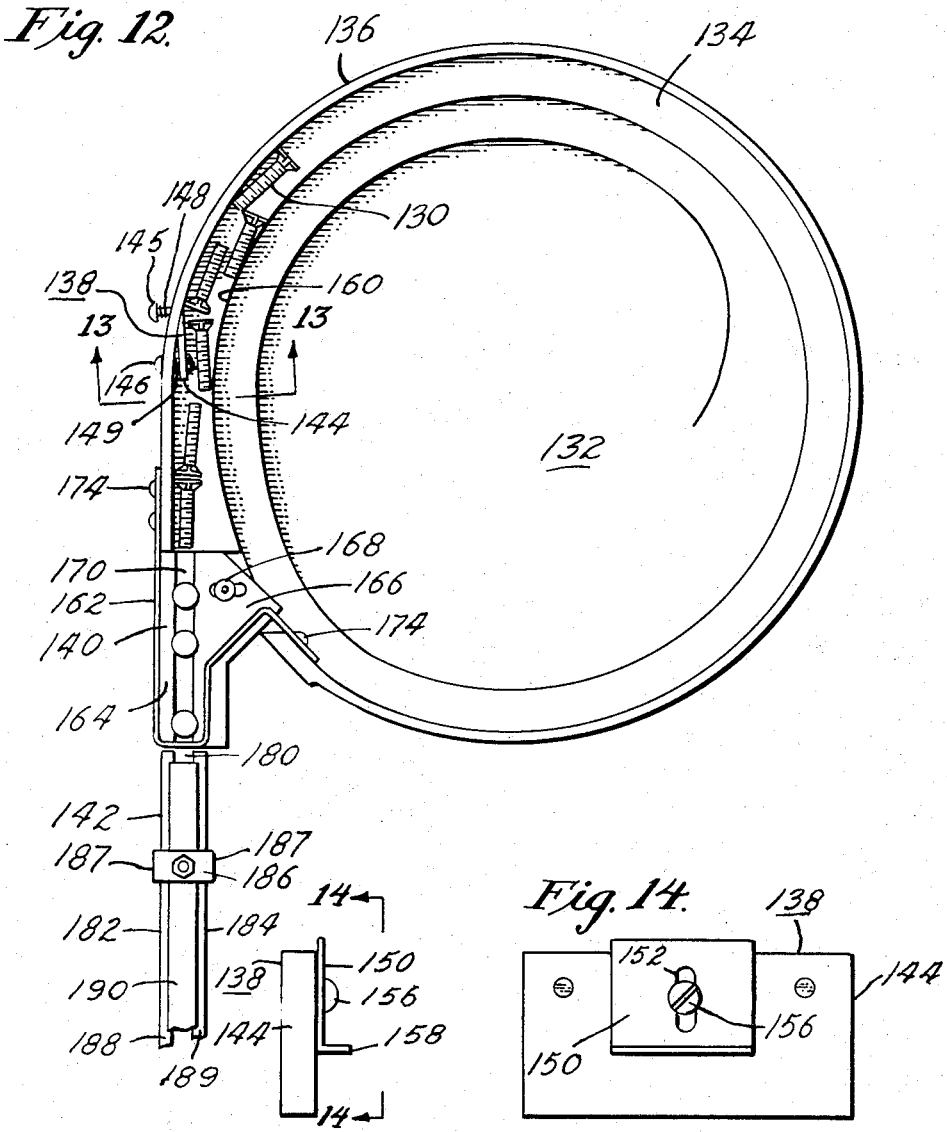

1

3,414,111
FEED HOPPER HAVING ADJUSTABLE ARTICLE ORIENTING MEANS
Richard B. Ernest, Richboro, Pa., assignor to Penn Engineering and Manufacturing Corporation, Doylestown, Pa., a corporation of Delaware
Filed Mar. 8, 1967, Ser. No. 621,534
8 Claims. (Cl. 198—33)

ABSTRACT OF THE DISCLOSURE

A vibratory hopper having a ramp or step along which a fastener or the like is movable. A plate carried by the hopper and positioned relative to the edge of the ramp so as to reject from the ramp a fastener whose center of gravity falls beyond the edge of the ramp. An adjusting means carried by the hopper and secured to the plate to move the plate toward or away from the edge of the ramp.

Background of the invention

The orienting devices disclosed herein are used in the Automated Press for Fasteners on which patent application Ser. No. 621,674 was filed on Mar. 8, 1967 in the names of Richard B. Ernest and Kenneth A. Swanstrom.

Brief summary of the invention

It is an object of this invention to provide easily adjustable orienting devices tending to feed to the track a single file of nuts, or the like, with their shanks up or down, as desired.

It is another object of this invention to provide an easily adjustable orienting device tending to feed to the track a single file of studs or the like.

The foregoing and other objects of this invention, the principles of this invention, and the best modes in which I have contemplated applying such principles will more fully appear from the following description and accompanying drawings in illustration thereof.

In the drawings:

FIG. 2 is a top view of a vibratory bowl, and a partial view of the track device fed by the bowl;

FIG. 3 is mostly a sectional view, taken along the line 3—3 in FIG. 2, showing an end view of the shank-down indicative orienter and part of the bowl, FIG. 3 being at an enlarged scale relative to FIG. 2 and showing a nut being passed;

FIG. 4 is a side elevation view taken along the line 4—4 in FIG. 3 showing the shank indicative orienter and part of the bowl at approximately the same scale as FIG. 3;

FIG. 5 is a view similar to FIG. 3, but showing the rejection of an improperly oriented nut;

FIG. 6 is a front elevation view of the layer orienter drawn at an enlarged scale relative to FIG. 2, but not as large a scale as that of FIGS. 3, 4 and 5;

FIG. 7 is a side view taken along the line 7—7 in FIG. 2 at approximately the scale of FIG. 2;

2

FIG. 12 is a top view of a stud orienter, of the bowl, and of a part of the track to receive the studs;

FIG. 13 is an end view of the stud orienter taken along the line 13—13 in FIG. 12 but at an enlarged scale; and FIG. 14 is a side view of the stud orienter taken along the line 14—14 in FIG. 13.

Figure 1:
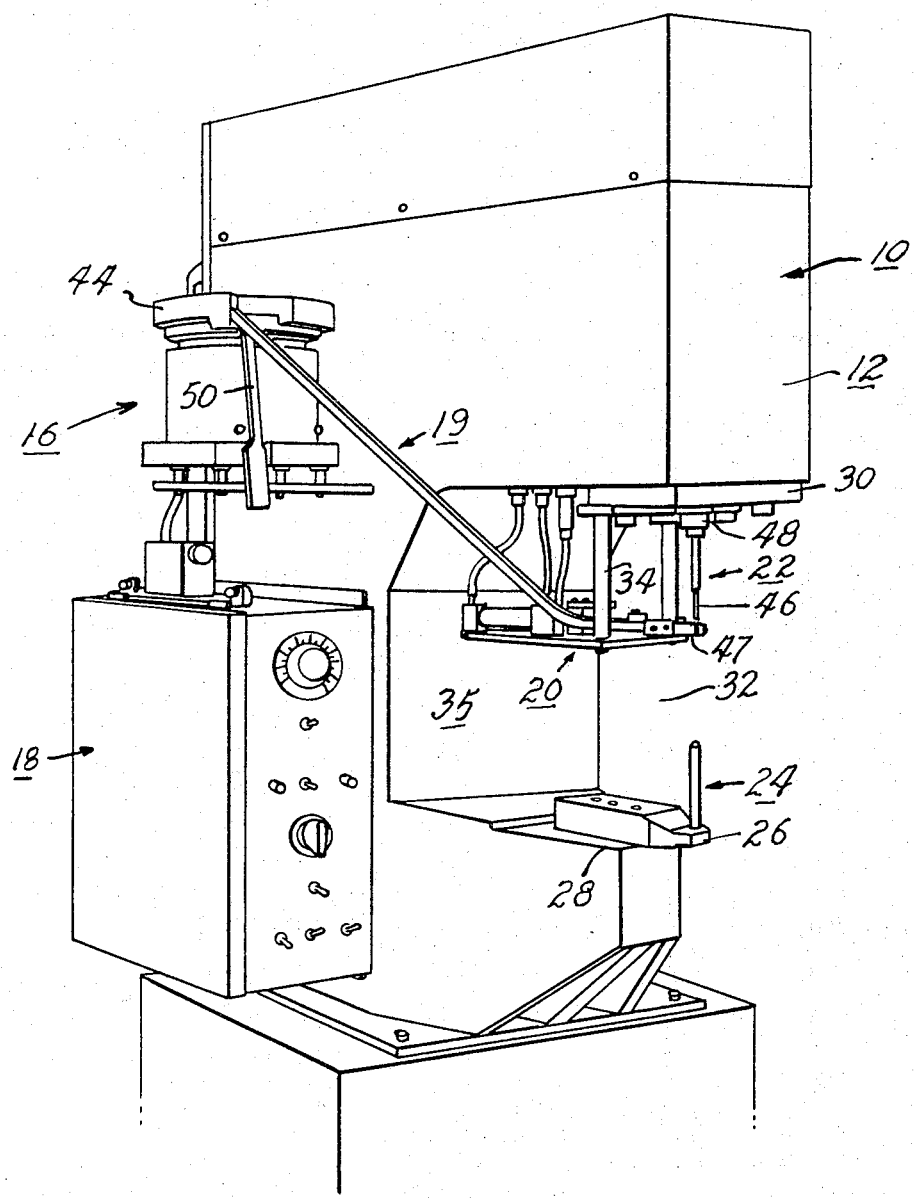
FIG. 1 is a front perspective view of the automated press having a vibratory bowl with fastener orienting devices constructed in accordance with this invention

Referring to FIG. 1, the press 10 comprises a generally upright frame 12 and includes a pneumatic and hydraulic circuit described in the aforementioned patent application. As illustrated, in FIG. 1, a fastener feed hopper assembly 16 is secured to one side of the frame 12, as is also an electrical control unit 18, the latter being also described in the aforementioned patent application.

The fastener feed hopper assembly 16 includes a track device 19 for delivery to the feeding mechanism, or gate assembly 20, a fastener 25, i.e., a nut or nut-like element, positioned below a punch assembly 22 which is, in turn, to be delivered by the punch assembly 22 to the work piece (not shown), but intended to rest upon an anvil assembly 24 carried by an anvil holder 26 which is suitably secured to the lower jaw 28 of the press.

The gate assembly 20 is suspended from the roof 30 of the mouth 32 of the press by columns 34 which are suitably secured to the roof 30, a rear wall 35 defining the back of the mouth 32.

To install a fastener upon a work piece with a suitable pre-punched hole, the work piece (which is not shown) is placed upon the anvil assembly 24 so that the anvil nose extends through the hole in the work piece.

Assuming that nuts are to be installed to the top surface of the work piece and assuming that the vibratory feed hopper or bowl 44 has a supply of the nuts 25 to be inserted, and that the track device 19 and gate assembly 20 are full thereof, the cycle of the press is initiated by closing an electrical switch, not shown, whereupon the punch assembly advances under a low force and the punch pilot 46 grasps a nut. Thereafter, the gate 47 is retracted and the punch assembly 22 continues its downward stroke, carrying a nut to the work piece. Near the end of the downward stroke of the punch assembly 22, a higher force is applied to the ram 48, the lower end only of which is seen in FIG. 1, to clinch the nut to the work piece. Thereafter the punch assembly 22 is returned to the position shown in FIG. 1 and after the forward part of the punch pilot 46 has moved upwardly sufficiently, the gate 47 returns to its initial position, as described in greater detail in the aforesaid patent application.

Referring to FIGS. 1 and 2, the upper end of the track device 19 is supported by a column 50, FIG. 1, so that the track groove 52 formed between two parallel plates 54 and 56 is in alignment with the exit channel 58 formed between an upstanding rim 60 of the bowl and a guide 62 bent upon itself with a rounded nose section 64. The plates 54 and 56 are secured by rivets 66 to a bottom plate 67 extending between them and forming the bottom of the track 52, the top of the groove being partly closed by a longitudinal cover 68 secured to the plate 56 by the same rivets that secure the bottom plate to it.

The bowl 44 has an inclined spiral-like peripheral ramp or step 70 having a lowest portion 72 at the bottom of the bowl and spiraling upward to form the bottom of the exit channel 58.

Vibratory bowls are well known in the art and are vibrated by devices not shown, to cause the nuts to march up the ramp 70 toward the exit channel 58.

As the nuts 25 march up the ramp 70 it is desired that they be limited to a single layer and for this purpose an L-shaped layer orienter 74 is provided secured by screws 75 which extend through vertical slots 76 in the orienter 74 and are threaded into the rim 60, the heads of the screws 75 holding the layer orienter at the proper height with the two steps of the ramp 70 shown in FIG. 6 so as to permit only one layer of nuts 25 to pass. The nuts in excess of this one layer are caused to fall back toward the center of the bowl by the two bent sections 78 and 79, bent as shown in FIG. 2.

The nuts in the ramp 70 then proceed toward a shank-down indicative orienter 80. The shank-down orienter 80 comprises a plate 81 having a channel or space 82 defined by a lip 83 of smaller height than the height of the smallest shank of the nut to be passed. The plate 81 has a tapered end abutting the rim 60 and is adjustably secured thereto by two fasteners or screws 84 and 85 which extend slidably through holes in the rim but which are threaded into the plate 81.

A compression coil spring 86 is placed between the head of the screw 84 and the rim to bias the tapered part of the plate against the rim 60 and a compression coil spring 87 is placed between the rim and the plate tending to move the plate toward the center of the bowl, but being restrained by the head of the screw 85.

The plate 81 is adjusted by lengthening or shortening the screw 85 so that the center of gravity of a nut properly with its shank down, FIG. 3, will pass through the edge of the ramp sufficiently to the left thereof to maintain the nut on the ramp. However, if a nut is inverted, has its shank up, as shown in FIG. 5, the larger diameter of the nut body will engage the lip 83 and cause the center of gravity of the nut to be sufficiently to the right of the ramp edge to cause the nut to topple toward the center of the bowl, i.e., rejecting the nut.

Preferably the lip 83 rests upon the ramp 70, as shown.

Those nuts which pass the orienter 80 proceed to the exit 58 and pass on into the inclined track 52 where they are conveyed by gravity to the gate assembly 20.

The guide 62 is provided with an elongated horizontal slot 90 through which extends a screw 91 which is threaded to the substantially circular rim and whose head secures the guide 62 against the rim to thereby easily adjust for varying diameter nuts at the exit 58.

Preferably, the ramp at the exit 58 is slightly above the adjacent edge forming the bottom of the track 52 to facilitate entry into the track 52 by the nuts.

Also, the cover 68 should preferably extend into the bowl and overlap some of the approaching nuts, as shown, for best results.

Figure 8:
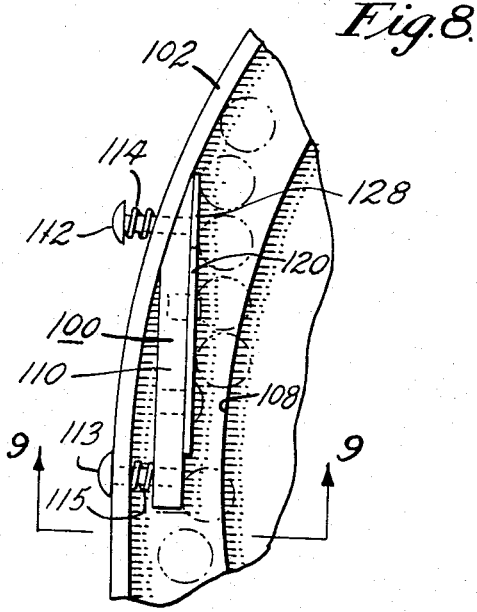
FIG. 8 is a top view of a shank-up indicative orienter and a partial view of the bowl.

Referring to FIGS. 8, 9, 10 and 11, a shank-up orienter 100 is illustrated associated with the rim 102 of a bowl similar to the previously described bowl 44 and having a spiral-like ramp 106 having an edge 108. The shank-up orienter comprises a plate 110 secured by screws 112 and 113 which slidably extend through holes in the rim 102. The screw 112 carries a compression spring 114 between the head of the screw and the rim 112, as illustrated in FIG. 8, to bias the tapered part of the plate 110 against the generally circular rim 102. The screw 113 carries a compression spring 115 between the rim 102 and the plate 110 to bias the plate 110 to the right, as shown in FIG. 8, relative to the part of the plate tapered portion which contacts the rim. The screws 112 and 113 are threaded into suitable holes in the plate 110 and the lateral position of the orienter relative to the edge 108 is adjusted by lengthening or shortening the length of the screw 113 which is threaded into the plate 110.

Figure 10:
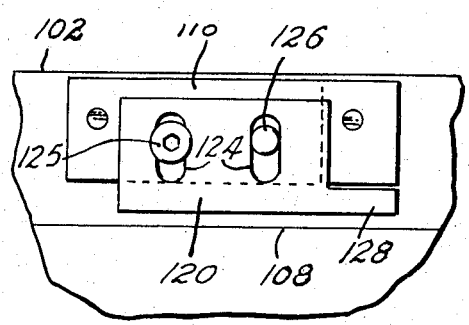
FIG. 10 is a side view of the orienter shown in FIG. 9 and a partial view of the bowl.

The plate 110 carries an adjustable slide 120 which has vertical slots 124 through which extend a screw 125 and a pin 126. The pin 126 is carried by the plate 110 and guides the movement of the slide 120 up and down. The screw 125 is threaded into the plate 110 and the head of the screw 125 bears against the slide 120 to tighten the slide with respect to the plate 110. The slide has a finger 128 extending toward and almost engaging the rim 102, as shown in FIGS. 8 and 10, to prevent the jamming of the nuts between the slide 120 and the rim 102 (which might otherwise take place if the finger 128 was not provided).

Figures 9, 11:
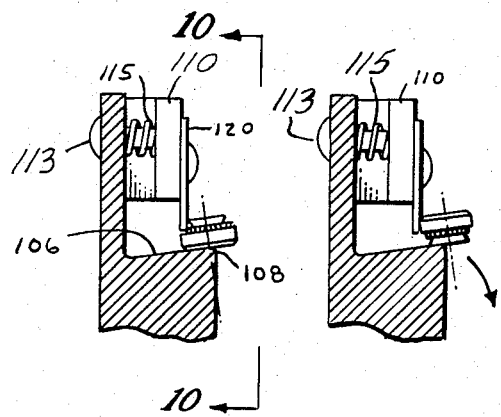
FIG. 9 is mostly a sectional view, taken along the line 9—9 in FIG. 8, showing an end view of the shank-up orienter passing a nut.
FIG. 11 is a view similar to FIG. 9 but showing a nut being rejected.

With the following arrangement, as the nuts march up the ramp or step 106, assuming that the slide has been adjusted vertically, as shown in FIG. 9, so that the shank only of the nut will be engaged by the lowest portion or guide surface of the slide 120 and the body of the nut will extend below the slide 120, in the space between the slide 120 and the ramp 106, the center of gravity of the nut will be to the left of the edge 108, whereby the nut passes the orienter 100 continuing its march up the ramp.

However, if the nut approaches the orienter 100 with its shank down, as shown in FIG. 11, the center of gravity of the nut will now be in a plane to the right of the edge 108, and the nut will be rejected, falling to a lower portion of the hopper.

FIG. 12 illustrates a bowl similar to that of FIG. 2 but modified for feeding studs 130. The bowl 132 also has a spiral-like ramp 134 and a generally circular rim 136. Attached to the rim 136 is a single pass and single layer stud orienter 138, which permits a single file and single layer of studs to proceed to the exit channel 140 from which they enter the track device 142.

The stud orienter 138 comprises a plate 144 with threaded holes into which screws 145 and 146 are threaded, the screws extending slidably through holes in the rim 136 and carrying compression springs 148 and 149 in the same arrangement relative to the rim, heads of the screws, and plate as discussed in connection with the orienters 80 and 100. The plate 144 carries a slide 150 having a vertical slot 152 and the slide 150 is adjusted vertically and tightened into place by means of the head of the screw 156. The slide 150 has a horizontal lip or leg 158 which is adjusted by virtue of the slot 152 and the screw 156, so as to permit only a single layer of studs 130 to pass beneath the leg 158.

The lower end portion of the plate 144, as viewed in FIG. 12, is adjusted laterally by the screw 146 toward or away from the edge 160 so as to permit only a single file of studs 130 to march up ramp 134.

The exit channel 140 comprises a generally U-shaped rim 162 having an integral, bent under, horizontal plate 164 upon which the left hand portion of a stud head rests. Beneath the right hand portion of the rim 162 is an adjustable slide 166 secured to the bowl 132 by the head of a screw 168 which is threaded into a hole into a bowl 132 the head of the screw 168 securing the slide laterally so as to provide the required space 170 into which the shank of a stud may drop and yet provide a ledge upon which the right hand portion of the stud head may rest.

The rim 162 may be secured to the rim 136 by screw 174, as shown in FIG. 12.

The space 170 is aligned with the track 180 formed by the track device 142 the track device comprises two spaced plates 182 and 184 secured together by a U-shaped clip 186 the legs of which 187 are attached by suitable screws, not shown, to the outer surfaces of the plates 182 and 184. The base of the U-shaped clip 186 is sufficiently spaced from the top surfaces 188 and 189 of the plates 182 and 184 so that a cover 190 may be secured to the base of the clip 186 without engaging the heads of the studs providing retracting guidance to the studs should they try to escape from between the plates 182 and 184 as they proceed down the inclined plates 182 and 184 by virtue of gravity, the forward portion of the head of one stud overlaps the rear portion of the head of the stud in front of it. While only one clip 186 has been illustrated a plurality may be provided depending on the length of the plates 182 and 184.

The nuts 25 and the studs 130 are referred to as "articles" in the appended claims. The screws 84 and 85, FIGURE 2, the screws 112 and 113, FIGURE 8, and the screws 145 and 146, FIGURE 12, are referred to as "elements" in the appended claims.

Having described this invention what I claim is:

1. A vibratory hopper having a step along which an article is movable, a plate carried by said hopper, said plate being positioned relative to the edge of said step so as to reject from said step an article whose center of gravity falls beyond the edge of said step, and adjusting means for said plate, said adjusting means being carried by said hopper and secured to said plate to move said plate toward or away from said edge said hopper includes a rim, said rim having a plurality of holes therein, said adjustment means comprising two elements slidably received in said holes in said rim, said elements having portions secured to said plate and spring means biasing one end of said plate away from said edge and the other end toward said edge.

2. The structure recited in claim 1 wherein said article has a large section at one end thereof and a small section at the other end, said plate including a projecting lip and means defining a space, said projecting lip permitting said article to pass along said step when engaged by said smaller section of said article at which time at least a part of said larger section of said article enters said space, but rejecting said article if the larger section of said article engages said lip.

3. The structure recited in claim 1 wherein said spring means comprises coil springs carried by said elements, 4. A vibratory hopper having a step along which a nut is movable, a plate carried by said hopper above said step, said plate being positioned relative to the edge of said step so as to reject from said step a nut whose center of gravity falls beyond the edge of said step, said plate including a projecting lip and means defining a space, said nut having a large section at one end and a small section at the other end, said projecting lip permitting said nut to pass when engaged by said smaller section of said nut at which time the larger section of said nut enters said space, but rejecting said nut if the larger section of said nut engages said lip, and means for adjusting said plate relative to the edge of said step wherein said means includes a spring and an element, said element being carried by said hopper and secured to said plate, said spring biasing said plate toward said edge, said hopper includes a rim, said rim having holes therein, said plate is disposed at an angle to said rim, said element is a screw slidably received in one of said holes in said rim, said screw having a portion at one end which abuts said rim on its outer side and another portion at the other end secured to said plate, and said spring is in the form of a coil spring carried by said screw between said rim and said plate and a second screw at the end of said plate nearest said rim for biasing this end of said plate toward said rim.

5. The structure recited in claim 4 and further including a layer orienting means for limiting said nuts to a single layer, and a guide means to channel the nuts out of the hopper.

6. A vibratory hopper having a step along which a nut is movable, a plate carried by said hopper above said step, said plate being positioned relative to the edge of said step so as to reject from said step a nut whose center of gravity falls beyond the edge of said step, said plate including a guide surface and defining a space between said guide surface and said step, said nut having a small portion at one end thereof and a large portion at the other end thereof, said guide surface permitting said nut to pass when engaged by the smaller portion of said nut at which time a section of the larger portion of said nut enters said space, but rejecting said nut of the larger portion of the nut engages said guide surface, and means for adjusting said plate relative to the edge of said step said means includes a spring and an element, said element being carried by said hopper and secured to said plate, said spring biasing said plate toward said edge, wherein said hopper includes a rim, said plate is disposed at an angle to said rim, said rim having a hole, said element is a screw slidably received in a hole in said rim, said screw having a portion at one end which abuts said rim on its outer side and another portion at the other end secured to said plate and said spring is a coil spring carried by said screw between said rim and said plate.

7. The structure recited in claim 6 said guide surface being adjustable to vary said space, a layer orienting means for limiting said nuts to a single layer, and a guide means to channel the nuts out of the hopper.

8. The structure recited in claim 7 and further including exit means connected to said hopper to receive said nuts.

References Cited
UNITED STATES PATENTS

| | | | |
|---|---|---|---|
| 2,159,049 | 5/1939 | Quamma | 221—163 |
| 2,321,548 | 6/1943 | Hanneman | 221—168 |
| 2,725,971 | 12/1955 | Clark-Riede | 221—159 X |
| 2,745,548 | 5/1956 | Schroeder | 221—157 X |
| 2,806,494 | 9/1957 | Kull | 221—157 X |
| 2,858,930 | 11/1958 | Aidlin | 221—157 X |
| 3,008,607 | 11/1961 | Troll | 221—167 X |
| 3,084,780 | 4/1963 | Whitney | 198—33 |
| 3,162,874 | 12/1964 | Autio | 198—33 X |
| 3,125,208 | 3/1964 | Secunda | 198—33 |
| 3,261,442 | 7/1966 | Beck | 221—158 X |

WALTER SOBIN, *Primary Examiner.*

UNITED STATES PATENT OFFICE
CERTIFICATE OF CORRECTION

Patent No. 3,414,111  December 3, 1968

Richard B. Ernest

It is certified that error appears in the above identified patent and that said Letters Patent are hereby corrected as shown below:

Column 1, line 26, "621,674" should read -- 621,647 --.

Signed and sealed this 10th day of March 1970.

(SEAL)
Attest:

Edward M. Fletcher, Jr.  WILLIAM E. SCHUYLER, JR.
Attesting Officer  Commissioner of Patents